Sept. 6, 1949.　　　　H. C. EDWARDS　　　　2,481,094
CENTRIFUGAL CHUCK

Filed Feb. 5, 1945　　　　　　　　　　2 Sheets-Sheet 1

INVENTOR:
Herbert C. Edwards,
by Carr Carr & Gravely
HIS ATTORNEYS.

Sept. 6, 1949.　　　　　H. C. EDWARDS　　　　　2,481,094
CENTRIFUGAL CHUCK
Filed Feb. 5, 1945　　　　　　　　　　　　2 Sheets-Sheet 2
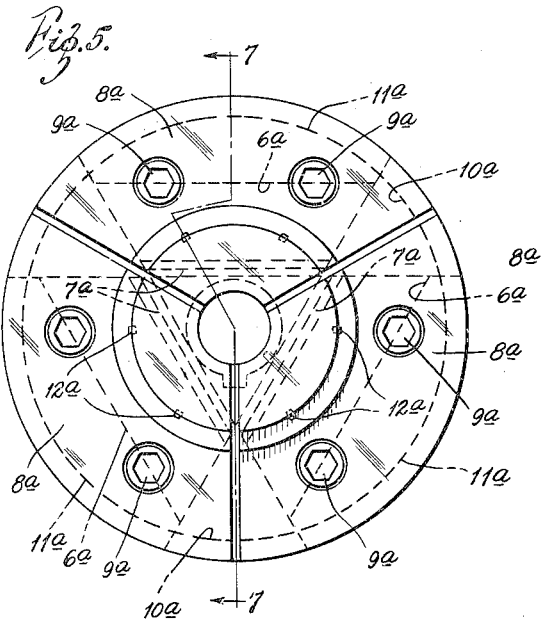
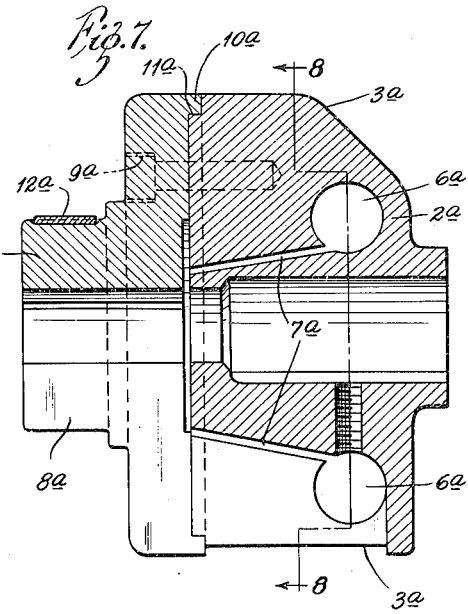
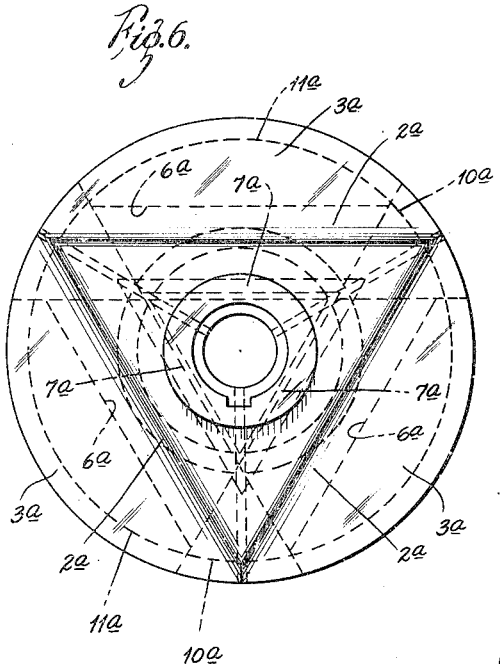
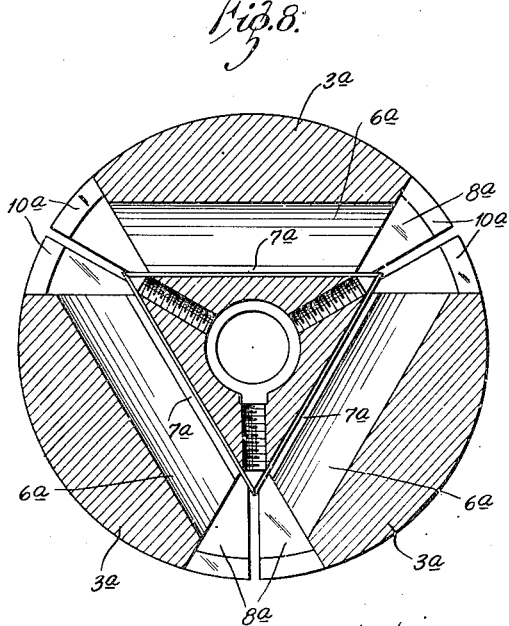
INVENTOR:
Herbert C. Edwards,
by Carr Harr Gravely
HIS ATTORNEYS.

Patented Sept. 6, 1949

2,481,094

UNITED STATES PATENT OFFICE 2,481,094

CENTRIFUGAL CHUCK

Herbert C. Edwards, Massillon, Ohio, assignor to
The Timken Roller Bearing Company, Canton,
Ohio, a corporation of Ohio Application February 5, 1945, Serial No. 576,165

3 Claims. (Cl. 279—2)

This invention relates to centrifugal chucks. It has for its principal objects a chuck of this type which will dispense with the separate centrifugal operating parts heretofore required for actuating the chuck jaws. The invention consists principally in providing the rotary chuck body with centrifugal jaw actuators that constitute an integral part of said body. The invention further consists in the centrifugal chuck and in the parts and arrangements and combinations of parts hereinafter described and claimed.

Figure 1:
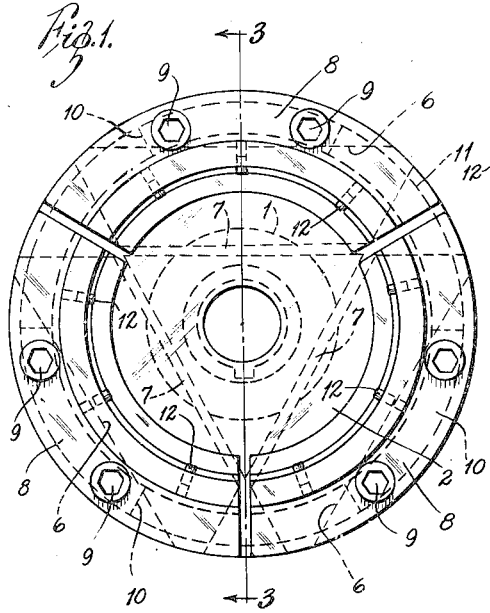
Figure 3:
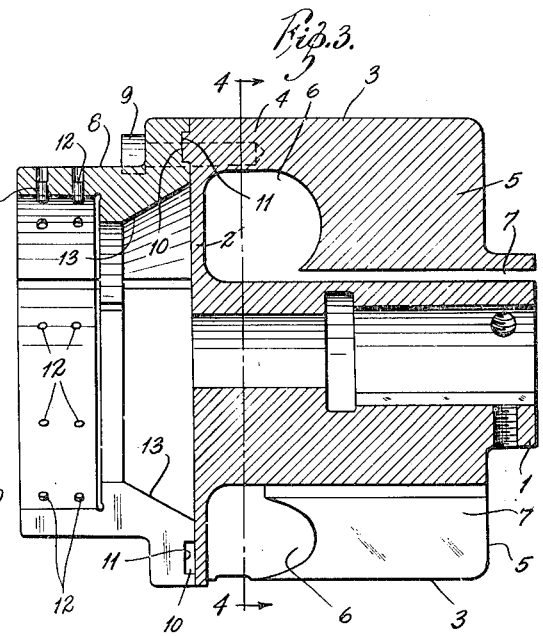
Figure 2:
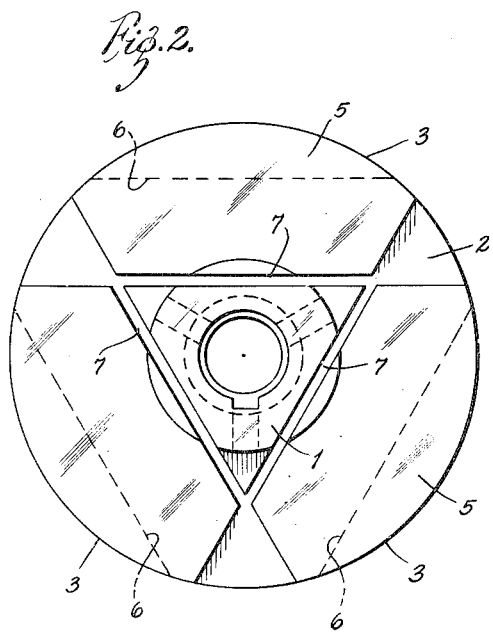
Figure 4:
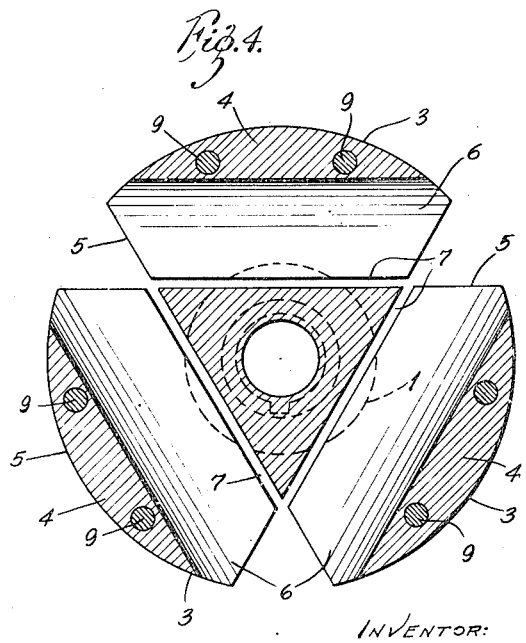

In the accompanying drawings, which form part of this specification and wherein like symbols refer to like parts wherever they occur, Fig. 1 is an elevational view of the jaw end of a centrifugal chuck embodying my invention, Fig. 2 is an elevational view of the opposite end of said chuck, Fig. 3 is a central vertical longitudinal sectional view on the line 3—3 in Fig. 1, Fig. 4 is a cross-sectional view on the line 4—4 in Fig. 3; and Figs. 5, 6, 7 and 8 are views similar to Figs. 1, 2, 3 and 4, respectively, illustrating a centrifugal chuck of modified form.

The centrifugal chuck shown in Figs. 1 to 4, inclusive, of the accompanying drawings, comprises a one-piece cylindrical body having a tubular hub 1 adapted for mounting on and rotation with a rotary machine tool spindle (not shown), a relatively thin outstanding circumferential flange or wall 2 integral with said hub at one end thereof, and a series of circumferentially spaced centrifugal arms 3 which are formed integral with the outer peripheral margin of said circumferential flange or wall and extend rearwardly about and clear of said hub to the other end thereof. The radial thickness of the centrifugal arms is reduced, as at 4, adjacent to the outstanding end flange or wall 2 so as to provide relatively thick and heavy portions 5 at the free rear ends of said arms. The rotary body of the chuck has three segmental centrifugal arms 3 that are produced preferably by three cross holes 6 that are arranged symmetrically in a triangle about the rotary axis of said body and form the relatively thin and thick portions 4 and 5, respectively, of said arms, and by three similarly arranged longitudinal saw cuts 7 that extend from side to side of said body from the rear end thereof to the cross holes 6 and thus separate said arms from each other and from the hub 1.

Secured to the front face of the arm supporting wall or flange 2 of the rotary chuck body concentric with the rotary axis thereof are three circumferentially spaced work or tool gripping jaws 8. Each of the jaws 8 is secured by means of cap screws 9 to the end wall or flange 2 at the outer peripheral margin thereof opposite one of the centrifugal arms 3 formed integral therewith. Movement of each chuck jaw 8 radially of the supporting wall 2 therefor is prevented by means of an arcuate rib 10 which is formed integral with said wall concentric therewith and seats in a corresponding arcuate groove 11 provided therefor in said jaw. Each of the jaws 8 is preferably provided near its outer end with work gripping pins 12 that project radially inwardly therefrom; and the inner end portion of said jaw is beveled, as at 13, so as to limit the contact between said jaw and said end wall to the portion of the latter located radially outwardly of the cross opening 6.

By the arrangement described, the thin end wall 2 of the chuck body forms a flexible support for the centrifugal arms 3. Thus, when the body is revolved rapidly the centrifugal force acting away from the axis about which the body rotates forces the three weighted centrifugal arms 3 to swing outwardly away from said axis about their points of connection with the end wall 2, which flexes to permit such swinging movement of said arms. At the same time, the flexibly supported inner ends of the centrifugal arms 3 and the chuck jaws 8 rigid with said ends swing inwardly towards the rotary axis of the chuck and thus cause the pins 12 to grip the work, tool or other member positioned in said jaws. The jaws 8 are secured to the end face of the flexible wall 2 directly in line with the centrifugal arms 3 so as not to interfere with the flexibility of said wall; and said wall has sufficient resiliency to return said arms and said jaws to work releasing position when the chuck is not rotating. The gripping force of the jaws depends on the weight and length of the centrifugal arms 3, the speed of rotation of the chuck and flexibility of the arm supporting wall 2.

In Figs. 5 to 8, inclusive, the invention is shown embodied in a chuck for gripping the inner peripheral surface of an annular body (not shown). In this chuck construction, the chuck body has three triangularly arranged cross holes 6a extending therethrough adjacent to the rear end thereof, so as to provide a relatively thin flexible rear end wall 2a. The body is also provided with three triangularly arranged slits or sawcuts 7a that extend from the front end face thereof and open into the cross openings 6a and extend crosswise of said body from side to side thereof, thereby forming three circumferentially spaced centrifugal arms 3a that are supported only by the thin flexible wall 2a. The arcuate work engaging jaws 8a are secured by means of cap screws 9a to the free front end faces of the centrifugal arms 3a and have arcuate outer marginal ribs 10a that overlap similarly shaped shoulders 11a on said end faces of said arms. The forward ends of the chuck jaws are shaped to fit within the bore of the work or tool and are provided with suitable work gripping inserts 12a. By this arrangement, when the chuck is rotated rapidly, the thin flexible wall 2a permits the arms 3a to swing outwardly under centrifugal force and thus cause the jaws 8a fixed to the free outer ends of said arms to expand into gripping engagement with the bore of the work.

The hereinbefore chuck construction has several important advantages. The jaw actuating elements of the chuck are formed integral with the body thereof and, at the same time, are adapted under centrifugal action of the rotating body to operate the chuck jaws to firmly grip the work. The construction is simple, economical and light in weight and it dispenses with the separate jaw actuators and the separate pivotal connections heretofore required for securing such actuators to the body of the chuck.

What I claim is:

1. A centrifugal chuck comprising a one-piece cylindrical body having portions thereof cut away to form a hub, a resilient outstanding circumferential flange integral with said hub adjacent to one end thereof and having a free unsupported outer peripheral marginal portion, and a series of circumferentially spaced jaw actuating arms integral with said free unsupported outer peripheral marginal portion and extending therefrom substantially the entire length of said hub and having free end portions of increased radial thickness lying closely adjacent thereto, whereby said arms are adapted for outward movement relative to said hub under the action of centrifugal force from the axis about which said body revolves, and a series of circumferentially spaced jaws mounted at one end of said body on the portion thereof that is formed by said resilient outstanding circumferential flange and said jaw actuating arms and moves in response to the action of centrifugal force, whereby said jaws are moved into gripping relation to a tool or work in response to such outward movement of said jaw actuating arms.

2. A centrifugal chuck comprising a one-piece cylindrical body having portions thereof cut away to form a rotary hub portion, an outstanding circumferential flange integral with said hub portion and having a free outer marginal portion, a series of circumferentially spaced centrifugal arms integral with and projecting from one face of said free outer marginal portion of said flange and extending alongside substantially from end to end but clear of said hub portion, and a series of circumferentially spaced normally inoperative work or tool gripping jaws removably secured to the other face of said free outer marginal portion of said flange opposite the respective arms, said flange being resilient, whereby the action of centrifugal force from the axis about which said hub portion revolves causes said arms to swing away from said axis and flex said free marginal portion of said resilient flange in a direction that will move said jaws towards said axis into gripping relation to the work or tool.

3. A centrifugal chuck comprising a rotary hub portion, a series of circumferentially spaced arms disposed about and extending lengthwise of said hub portion substantially from end to end thereof and a resilient wall integrally connecting said arms at one end to said hub, said arms being of increased radial thickness at their free, opposite ends, and jaws secured to the radially thickened free opposite ends of said arms, whereby said arms are adapted, under the action of centrifugal force from the axis about which said hub portion revolves, to swing outwardly away from said hub and force said jaws into gripping engagement with a work piece or tool sleeved thereon.

HERBERT C. EDWARDS.

REFERENCES CITED

The following references are of record in the file of this patent:

UNITED STATES PATENTS

| Number | Name | Date |
|---|---|---|
| 1,827,415 | Bidwell | Oct. 13, 1931 |
| 1,939,644 | Bechert | Dec. 19, 1933 |

FOREIGN PATENTS

| Number | Country | Date |
|---|---|---|
| 474,962 | Great Britain | Nov. 10, 1937 |